(12) United States Patent
Koy et al.

(10) Patent No.: US 6,543,260 B2
(45) Date of Patent: Apr. 8, 2003

(54) RECEIVER LOCK

(75) Inventors: Tim Vander Koy, Mosinee, WI (US); Sung Soo Kim, Bucheon (KR)

(73) Assignee: Fulton Performance Products, Inc., Mosinee, WI (US)

( * ) Notice: Subject to any disclaimer, the term of this patent is extended or adjusted under 35 U.S.C. 154(b) by 14 days.

(21) Appl. No.: 09/776,112

(22) Filed: Feb. 2, 2001

(65) Prior Publication Data

US 2002/0104338 A1 Aug. 8, 2002

Related U.S. Application Data

(60) Provisional application No. 60/257,910, filed on Dec. 21, 2000.

(51) Int. Cl.[7] .............................................. E05B 67/36
(52) U.S. Cl. ................................ 70/34; 70/14; 70/258; 70/31; 280/507
(58) Field of Search .................... 70/34, 14, 31, 70/32, 258, 33, 35; 280/507

(56) References Cited

U.S. PATENT DOCUMENTS

| | | | |
|---|---|---|---|
| 1,491,691 A | 4/1924 | Godshalk | 70/260 |
| 1,744,984 A | 1/1930 | Page | 70/34 |
| 2,104,981 A | 1/1938 | Falk | 70/33 |
| 3,410,580 A | 11/1968 | Longenecker | 280/507 |
| 3,492,023 A | 1/1970 | Thompson | 280/507 |
| 3,526,110 A | 9/1970 | Foote | 70/258 |
| 3,810,664 A | 5/1974 | Nunnink, Jr. et al. | 280/507 |
| RE28,187 E | 10/1974 | Longenecker | 280/507 |
| 4,183,235 A | 1/1980 | Coralli et al. | 70/34 |
| 4,476,699 A * | 10/1984 | Dahlborg | 70/34 |
| 4,576,021 A | 3/1986 | Holden | 70/34 |
| 4,637,234 A * | 1/1987 | Mielonen | 70/34 |
| 4,711,106 A | 12/1987 | Johnson | 70/34 |
| 4,777,809 A | 10/1988 | Wiggins | 70/57 |
| 4,844,498 A | 7/1989 | Kerins et al. | 280/504 |
| 4,989,892 A | 2/1991 | Kerins et al. | 280/504 |

(List continued on next page.)

OTHER PUBLICATIONS

Life–Long Locks, Inc., Trailer Hitch Receiver Lock web page dated Jul. 14, 2000, http://www.life–longlocks.com/, 1 page.

Rhode Gear/Bell Sports, "Rhode Gear Accessories" flyer, date unknown but presumed at least as early as the filing date of this application, 2 pages.

C.T. Johnson Enterprises, Inc., "Dead–Bolt Locks" flyer, 1997, 5 pages.

Swagman Bicycle Carriers, web page dated Dec. 2, 1999, http://www.swagman.net/contact.html, 2 pages.

*Primary Examiner*—Anthony Knight
*Assistant Examiner*—John B. Walsh
(74) *Attorney, Agent, or Firm*—Craig A. Fieschko, Esq.; DeWitt Ross & Stevens S.C.

(57) ABSTRACT

A coupler lock for securing a device within a sleeve of a vehicle hitch to prevent unauthorized removal of the device which can include a hitch ball insert, a cargo platform, bike carrier or similar accessory designed to be attached to the vehicle. The coupler lock includes a lock housing removably attached to one end of a lock bar configured to pass through apertures within the hitch sleeve and insert. The lock housing has a plurality of ball bearings radially movable in and out of an annular groove to lock and release the bar. A locking cup longitudinally movable within the lock housing in response to movement of the lock cylinder retains the bearings within the groove or releases the bearings from removal of the lock bar from the lock housing.

20 Claims, 2 Drawing Sheets

U.S. PATENT DOCUMENTS

| | | | |
|---|---|---|---|
| 5,000,067 A | | 3/1991 | Kolbusz et al. ............... 81/436 |
| 5,197,314 A | * | 3/1993 | Stillwagon et al. ........... 70/386 |
| 5,284,038 A | | 2/1994 | Johnson ....................... 70/232 |
| 5,442,941 A | | 8/1995 | Kahonen et al. ............... 70/34 |
| 5,540,065 A | | 7/1996 | Wyers ........................... 70/26 |
| 5,664,445 A | | 9/1997 | Chang ........................... 70/34 |
| 5,752,398 A | | 5/1998 | Villalon, Jr. ................... 70/58 |
| 5,992,187 A | * | 11/1999 | Derman ......................... 70/58 |
| 5,992,193 A | | 11/1999 | Bronk, III .................... 70/253 |
| 6,055,832 A | * | 5/2000 | Wyers ........................... 70/34 |
| 6,237,376 B1 | * | 5/2001 | Surratt |
| 6,345,522 B1 | * | 2/2002 | Stillwagon et al. ........... 70/277 |
| 6,364,339 B1 | * | 4/2002 | Lee ............................. 280/507 |

\* cited by examiner

RECEIVER LOCK

RELATED APPLICATIONS

This application claims priority from U.S. Provisional Application No. 60/257,910 filed on Dec. 21, 2000.

BACKGROUND OF THE INVENTION

I. Field of the Invention

This invention relates to locks for securing an insert mating received within a sleeve of a vehicle hitch and, in particular, to a coupler lock with ease of operation by manually engaging a lock assembly to capture a plurality of ball bearings within an annular groove of a lock bar to prevent separation of the lock housing from the lock bar thereby securing the insert within the hitch sleeve.

II. Description of the Prior Art

Historically, hitches mounted to a towing vehicle included fixed components permanently secured to the vehicle. The hitch body was bolted or welded to the vehicle and included a hitch ball fixed to the hitch structure. As hitch manufacturers developed more uses for their hitches, the fixed ball was replaced by a removable ball insert received within a sleeve forming a part of the hitch body. Both the insert and sleeve had a rectangular configuration such that the sleeve would matingly receive the insert. To prevent inadvertent removal of the sleeve, a pin inserted transversely through the insert and sleeve mated the components. The insert could be conveniently removed for interchange to a different insert associated with an accessory such as a cargo platform, bike carrier, ski rack, etc. However, this freedom to interchange accessories also lended them to theft since removal was as simple as removing a pin.

In order to prevent removal of the lock pin and therefore unauthorized removal of the hitch accessory, various locking means were developed. A lock secured to the pin was first developed which prevented withdrawal of the pin without first removing the lock. These add-on locks proved cumbersome to use and were subjected to the elements of the road along with the rest of the undercarriage.

Specialized lock pins incorporating a locking mechanism were developed which allowed the user to replace the lock pin with the coupler lock. These locks included a combination or key lock to release the coupler lock for removal of the insert. However, many of these coupler. locks were inconvenient to use and subject to failure because of the locking mechanisms.

SUMMARY OF THE PRESENT INVENTION

The present invention overcomes the disadvantages of the prior known coupler locks by providing a convenient to use lock which can be engaged with a push of a button to engage ball bearings to capture a locking pin of the lock.

The coupler lock of the present invention has a barbell configuration with enlarged end portions and a narrower intermediate section configured to fit through the aligned apertures of the hitch sleeve and the insert. One of the enlarged ends is a lock housing which is detachable from the lock pin upon operation of the key lock. The lock pink may be inserted through the sleeve and insert and the lock housing attached to the free end of the lock pin to secure the coupler lock in the hitch.

The lock housing includes radially movable ball bearings adapted to selectively engage an annular groove in the end of the lock pin. The ball bearings are forced radially inward into the groove of the lock pin by a locking cup which is longitudinally shiftable within the lock housing. The locking cup is biased toward an unlocked position by a spring and moved to the locked position upon engagement of the lock cylinder. The lock cylinder is manually shiftable to force the locking cup over the bearings. A key must be used to release the lock allowing the locking cup to be longitudinally biased by the spring to release the ball bearings. The primary advantage of the present invention is the convenience of manually locking the lock simply by depressing the lock cylinder.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
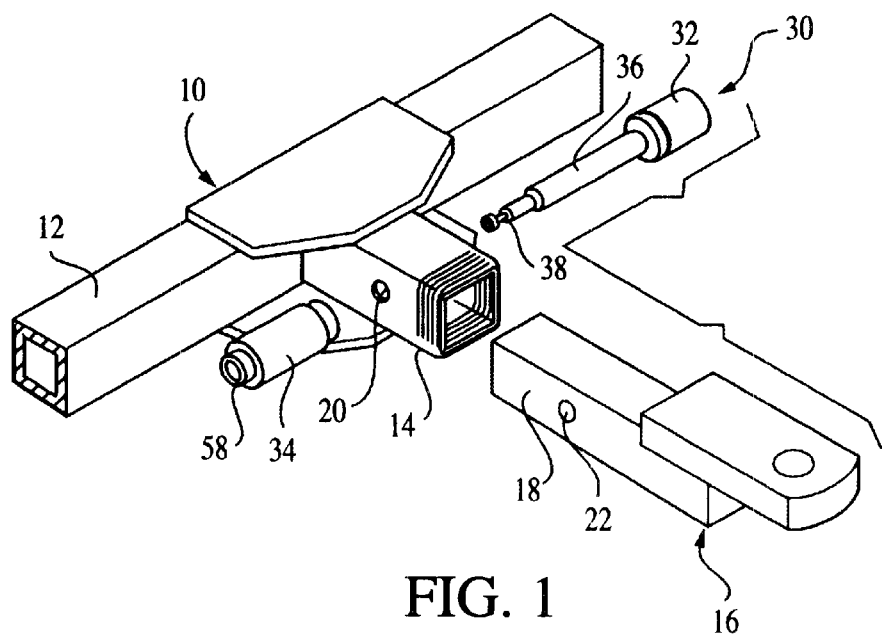
FIG. 1 is a perspective view of a hitch assembly having a coupler and the coupler lock of the present invention inserted into the hitch sleeve.
Figure 2:
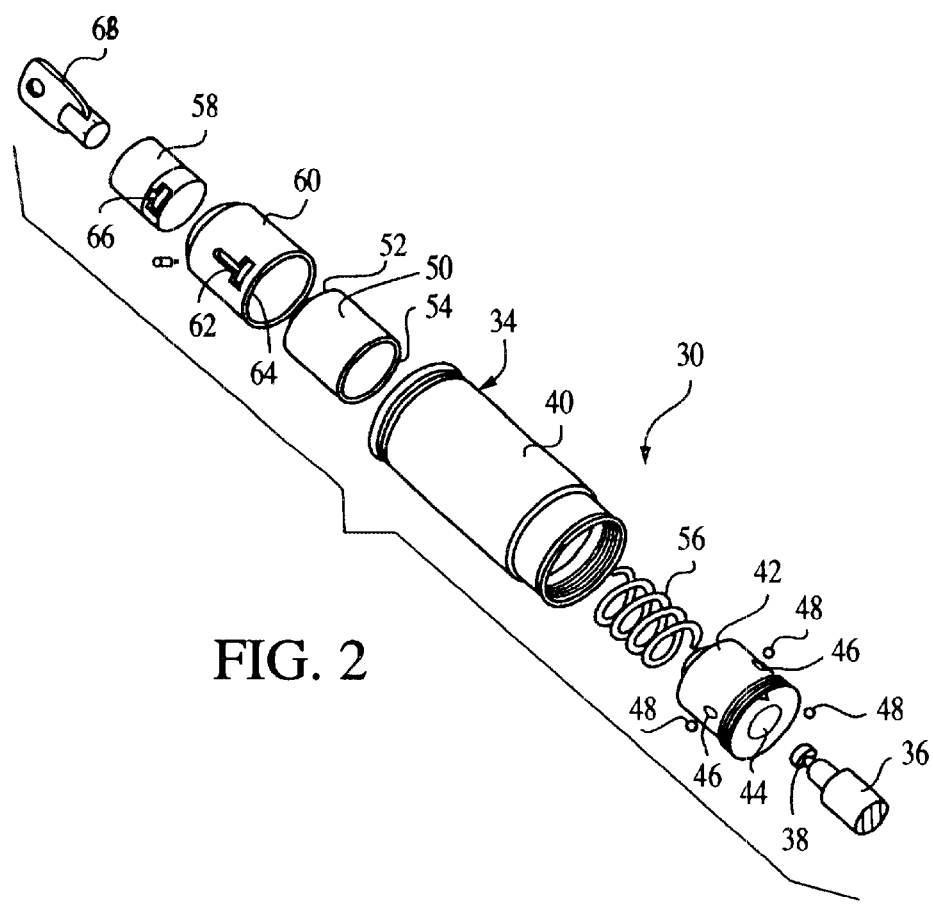
FIG. 2 is an exploded view of the coupler lock.

Referring first to FIG. 1, there is shown a hitch assembly 10 suitable for mounting to a towing vehicle (not shown). The structure of the hitch 10 can vary from manufacturer to manufacturer and model to model although the hitch 10 will include structure for securely attaching the hitch assembly 10 to the vehicle proximate the rear bumper. Typically, the hitch 10 will include a crossbar 12 extending parallel to the rear of the vehicle and a sleeve 14 secured to and extending perpendicular to the crossbar 12. The sleeve 14 typically has a square cross-sectional configuration although a variety of configurations could be employed. The sleeve 14 is adapted to receive a similarly configured insert 16 such as the hitch ball insert shown in FIG. 1. The insert 16 will include a male portion 18 which may be matingly inserted into the sleeve 14 for mounting to the hitch 10. The male portion 18 may form a part of any number of accessories intended to be detachably mounted to the hitch 10 including cargo carriers, bicycle carriers, ski racks, folding tables, tailgating equipment and a variety of coupler inserts.

Referring now to FIGS. 1 through 4, in order to prevent withdrawal of the insert 16 from the sleeve 14 during transport, the insert 16 must be secured within the sleeve 14. Both the sleeve 14 and the male portion 18 of the insert 16 includes aligned apertures 20,22 respectively. Upon alignment of the apertures 20 and 22 a pin may be inserted transversely through the sleeve 14 and insert 16 to prevent withdrawal. However, the coupler lock 30 of the present invention not only prevents separation of the insert 16 form the hitch 10 but also includes a locking mechanism to prevent unauthorized removal of the coupler lock 30 as will be subsequently described.

The coupler lock 30 generally has a dog bone or dumbbell configuration with enlarged end portions 32,34 and intermediate pin section 36 configured to fit through the apertures 20,22. The end portions 32,34 are larger so as not to be capable of passing through the apertures 20,22. In a preferred embodiment, one of the end portions 32 is fixedly attached to the pin 36 while the other end portion 34 is a lock assembly capable of being detachably mounted to the pin 36. The free end of the pin 36 includes an annular groove 38 engageable by the lock assembly 34.

The lock assembly 34 includes a cylindrical lock housing 40. Mounted within the housing 40 is a bearing cage 42 having a partial axial bore 44 for receiving the end of the pin section 36. A plurality of radial ports 46 in the side wall of the bearing cage 42 retain radially movable ball bearings 48. Preferably the bearing cage 42 is threadably mounted within the housing 40 to facilitate maintenance of the lock assembly 34. The bearing cage 42 is received within a longitudinally shiftable locking cup 50. The locking cup 50 includes an endwall 52 and a cylindrical side wall 54 which fits over the bearing cage 42. Disposed within the locking cup 50 is a spring 56 to bias the cup 50 longitudinally outwardly. The biasing spring 56 is sealed between an end of the bearing cage 42 and the end wall 52 of the locking cup 50.

The locking cup 50 is longitudinally shiftable in response to engagement and unlocking of a lock cylinder 58 which is received within a lock sleeve 60 fixedly mounted within the lock housing 40. The lock sleeve 60 includes a slot 62 formed in a wall 64 of the lock sleeve 60. The lock cylinder 58 has an internal keyable locking mechanism which operates a radially extendable lock bolt. 66. Upon alignment, the lock bolt 66 is extendable into the slot 62 to prevent longitudinal movement of the lock cylinder 58 within the lock sleeve 60. A key 68 is used to retract the bolt 66 from the slot 62 allowing longitudinal shifting of the lock cylinder 58 which, in turn, allows shifting of the locking cup 50 as will be described.

Figure 4:
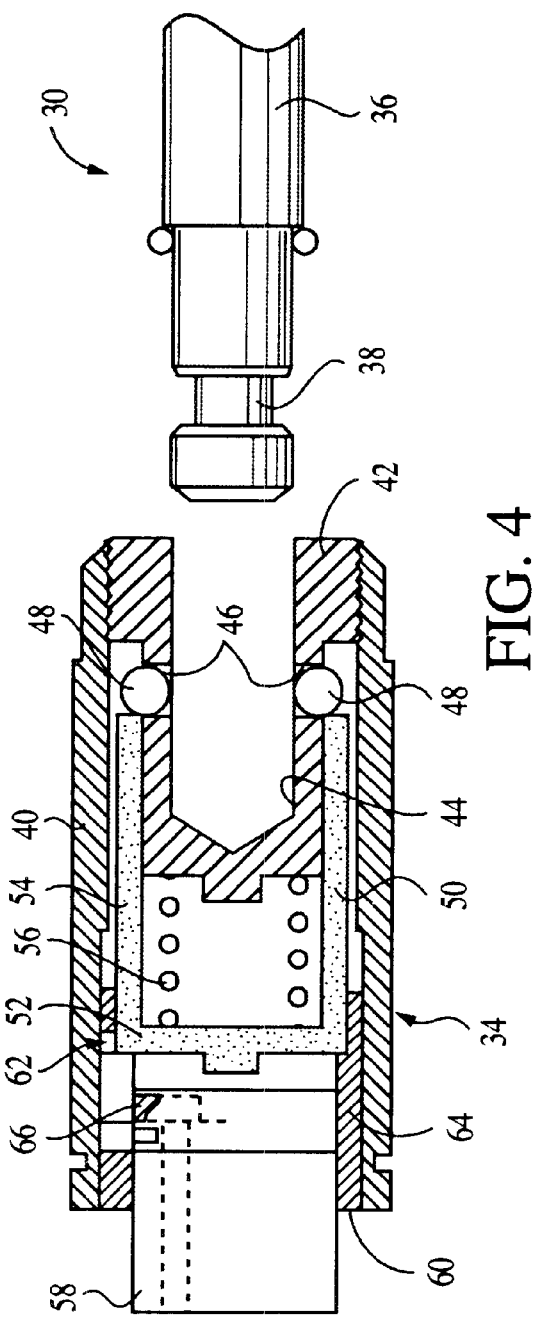
FIG. 4 is a partial cross-sectional view of the coupler lock in a released position.

Operation of the coupler lock 30 facilitates simple engagement of the locking mechanism to secure the coupler lock 30 within the aligned apertures 20,22 and subsequent key operation of the locking mechanism to remove the coupler lock 30. As will be subsequently described, the locking mechanism is engaged simply by depressing the lock cylinder 58. With the lock assembly 34 secured to the lock pin 36, the key 68 can be inserted into the end of the lock cylinder 58 and operated to retract the lock bolt 66 from the slot 62. With the lock cylinder 58 released, the bias of the spring 56 will force the lock cup 50 and lock cylinder longitudinally outwardly as shown in FIG. 4. As the locking cup 50 shifts it will uncover the ports 46 of the bearing cage 42 freeing the ball bearings 48. The lock pin 36 may now be retracted from the lock assembly 34 causing the bearings to move radially outwardly. The lock pin 36 can now be moved in and out of the apertures 20,22 to secure the insert 16 within the hitch sleeve 14.

Figure 3:
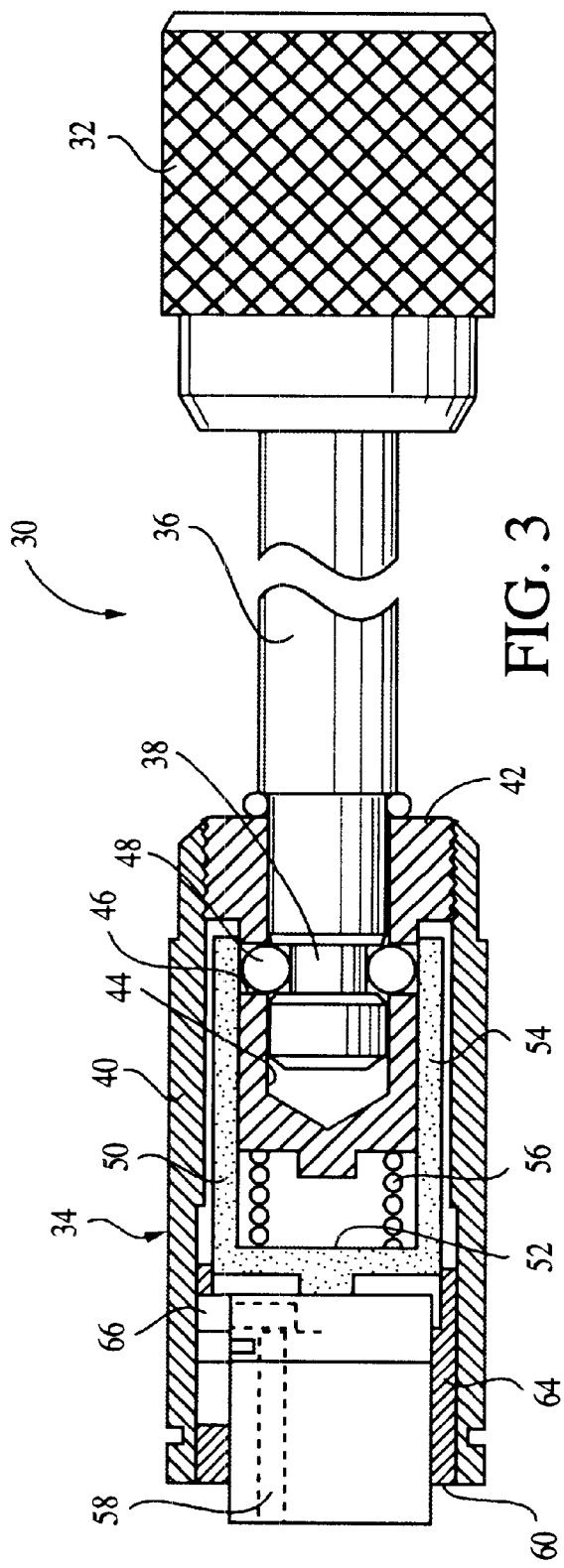
FIG. 3 is a partial cross-sectional view of the coupler lock in a locked position.

To re-engage the coupler lock 30 of the present invention, the lock pin 36 is inserted into the partial bore 44 of the bearing cage 42. Simple depression of the lock cylinder 58, such as by a users thumb, will lock the end member 34 to the lock pin 36 (FIG. 3). As the lock cylinder 58 is depressed, the locking cup 50 will be moved longitudinally forcing the ball bearings 48 radially inwardly into the groove 38 of the lock pin 36. With the bearings 48 in the groove 38, the pin 36 cannot be retracted and the locking cup 50 prevents the bearings 48 from moving radially outwardly out of the annular groove 38. As the lock cylinder 58 shifts inwardly, the bolt 66 will again extend into the slot 62 to prevent movement of the lock cylinder 58 until the key 68 is used to retract the bolt 66.

The foregoing detailed description has been given for clearness of understanding only and no unnecessary limitations should be understood therefrom as some modifications will be obvious to those skilled in the art without departing from the scope and spirit of the appended claims.

What is claimed is:

1. A coupler lock adapted to lockingly connect an accessory insert within a sleeve of a vehicle hitch assembly, the sleeve and insert including alignable apertures, said coupler lock comprising:
    a. a lock pin having an enlarged end member, said lock pin configured to extend through the aligned apertures of the insert and sleeve to prevent removal of the insert from the sleeve; and
    b. a lock assembly detachably mountable to a first end of said lock pin to prevent withdrawal of said lock pin from the aligned apertures, said lock assembly including:
        (1) a lock housing, and
        (2) a locking mechanism extending from the lock housing, wherein the locking mechanism is manually depressible within the lock housing to shift said locking mechanism from an unlocked position to a locked position;
        wherein the lock assembly is manually manipulable to engage said locking mechanism and lockingly attach said lock assembly to said lock pin, said locking mechanism operable with a key to disengage said locking mechanism for removal of said lock assembly from said lock pin.

2. The coupler lock as defined in claim 1 wherein said lock assembly includes a bearing cage mounted within said lock housing, said bearing cage having an axial bore for receiving said first end of said lock pin and a plurality of lock bearings seated within a wall of said bearing cage, said lock bearings selectively movable between an unlocked position and a locked position lockingly engaging said first end of said lock pin to prevent withdrawal from said bore.

3. The coupler lock as defined in claim 2 wherein said lock bearings are ball bearings seated within ports formed in said annular wall of said bearing cage, said ball bearings movable radially between said unlocked and locked positions.

4. The coupler lock as defined in claim 2 wherein said lock assembly further comprises a locking cup positioned within said lock housing in mating relationship with said bearing cage, said locking cup having an end wall and a cylindrical side wall such that said bearing cage is matingly received within said locking cup, said locking cup longitudinally shiftable in response to movement of said locking mechanism between a locked position engaging said locking bearings and an unlocked position releasing said locking bearings.

5. The coupler lock as defined in claim 4 wherein said locking cup and locking mechanism are biased towards said unlocked position by a spring.

6. The coupler lock as defined in claim 5 wherein said spring is disposed within said locking cup between said bearing cage and said end wall of said locking cup.

7. The coupler lock as defined in claim 5 wherein said locking mechanism includes a lock bolt selectively retractable to unlock said locking mechanism upon operation of said key, said lock bolt biased towards an extended position such that depression of said locking mechanism to longitudinally shift said locking mechanism to said locked position extends said lock bolt into a catch preventing movement of said locking mechanism and locking cup from said locked position.

8. The coupler lock as defined in claim 7 wherein said first end of said lock pin includes an annular groove, said lock bearings captured within said groove upon movement of said locking cup to said locked position engaging said lock bearings thereby preventing withdrawal of said lock pin from said axial bore of said bearing cage.

9. The coupler lock as defined in claim 7 wherein said catch is formed in a lock sleeve mounted within said lock housing, said catch formed by a slot in a wall of said lock sleeve whereby said lock bolt moves radially outwardly into said slot to retain said locking mechanism in said locked position, operation of said key radially retracting said lock bolt from said slot for movement of said locking mechanism to said unlocked position.

10. A coupler lock adapted to lockingly connect an accessory insert within a sleeve of a vehicle hitch assembly, the sleeve and insert including alignable apertures, said coupler lock comprising:
   a. a lock pin having an enlarged end member, said lock pin configured to extend through the aligned apertures of the insert and sleeve to prevent removal of the insert from the sleeve;
   b. a lock assembly detachably mountable to a first end of said lock pin to selectively prevent withdrawal of said lock pin from the aligned apertures, said lock assembly including
      (1) a lock housing,
      (2) a bearing cage mounted within said lock housing, said bearing cage having an axial bore for receiving said first end of said lock pin,
      (3) a plurality of lock bearings seated within a wall of said bearing cage, the lock bearings being radially movable between a locked position lockingly engaging said first end of said lock pin and an unlocked position releasing said first end for removal of said lock pin from said lock assembly,
      (4) a locking cup positioned within said lock housing in mating relationship with said bearing cage, said locking cup having an end wall and a cylindrical side wall such that said bearing cage is matingly received within said locking cup,
      (5) a locking mechanism longitudinally shiftable and manually depressible within the lock housing to move to a locked position thereby moving said locking cup so that said lock bearings are moved into locking engagement with said first end of said lock pin, said locking mechanism mechanically operable with a key to disengage said locking mechanism for movement to an unlocked position thereby moving said locking cup so that said lock bearings are.moved out of locking engagement with said first end facilitating withdrawal of said lock pin from said lock assembly, and
      (6) a spring biasing said locking mechanism and said locking cup towards said unlocked position.

11. The coupler lock as defined in claim 10 wherein said lock bearings are ball bearings seated within ports formed in said annular wall of said bearing cage, said ball bearings movable radially between said unlocked and locked positions.

12. The coupler lock as defined in claim 10 wherein said spring is disposed within said locking cup between said bearing cage and said end wall of.said locking cup.

13. The coupler lock as defined in claim 10 wherein said locking mechanism includes a lock bolt selectively retractable to unlock said locking mechanism upon operation of said key, said lock bolt biased towards an extended position such that depression of said locking mechanism to longitudinally shift said locking mechanism to said locked position extends said lock bolt into a catch preventing movement of said locking mechanism and locking cup from said locked position.

14. The coupler lock as defined in claim 13 wherein said first end of said lock pin includes an annular groove, said lock bearings captured within said groove upon movement of said locking cup to said locked position engaging said lock bearings thereby preventing withdrawal of said lock pin from said axial bore of said bearing cage.

15. The coupler lock as defined in claim 13 wherein said catch is formed in a lock sleeve mounted within said lock housing, said catch formed by a slot in a wall of said lock sleeve whereby said lock bolt moves radially outwardly into said slot to retain said locking mechanism in said locked position, operation of said key radially retracting said lock bolt from said slot for movement of said locking mechanism to said unlocked position.

16. A coupler lock adapted to lockingly connect an accessory insert within a sleeve of a vehicle hitch assembly, the vehicle hitch sleeve and accessory insert including alignable apertures, said coupler lock comprising:
   a. a lock pin having
      (1) a first end configured to extend through the aligned apertures of the accessory insert and vehicle hitch sleeve, and
      (2) an end member opposite the first end, the end member being configured to prevent its movement through the aligned apertures whereby the end member prevents removal of the accessory insert from the vehicle hitch sleeve;
   b. a lock assembly detachably mountable to the first end of the lock pin to prevent withdrawal of the lock pin from the aligned apertures, the lock assembly including:
      (1) a lock housing, and
      (2) a locking mechanism extending from the lock housing, wherein the locking mechanism is:
         (a) manually depressible within the lock housing to shift the locking mechanism from an unlocked position to a locked position wherein the lock assembly lockingly attaches to the lock pin, and
         (b) operable with a key to shift the locking mechanism from the locked position to the unlocked position wherein the lock pin is removable from the lock assembly.

17. The coupler lock of claim 16 further comprising a spring within the lock housing, the spring biasing the locking mechanism into the unlocked position.

18. The coupler lock of claim 16 further comprising:
   a. a locking cup within the lock housing, the locking cup being movable in response to movement of the locking mechanism;
   b. a bearing cage within the locking cup, the bearing cage having an axial bore for receiving the first end of the lock pin;
   c. one or more bearings seated within a wall of the bearing cage, the lock bearings being radially movable by the locking cup to lockingly engage the first end of the lock pin when the locking mechanism is in the locked position to prevent withdrawal of the lock pin from the bore of the bearing cage.

19. The coupler lock of claim 18 wherein a spring is interposed between the bearing cage and locking cup, the spring biasing the locking cup away from the bearing cage.

20. The coupler lock of claim 16 further comprising:

a. a locking cup within the lock housing, the locking cup being movable in response to movement of the locking mechanism;

b. one or more bearings within the lock housing, the lock bearings being radially movable by the locking cup to lockingly engage the first end of the lock pin when the locking mechanism is in the locked position to prevent withdrawal of the lock pin from the bore of the bearing cage; and c. a spring biasing the locking cup and locking mechanism toward the unlocked position.

* * * * *